Jan. 30, 1951

D. C. BEATTY

APPARATUS FOR DELIVERING AND RECEIVING TELEPHONE MESSAGES

Filed March 4, 1949

2,539,565

Donald C. Beatty
INVENTOR

BY C. A. Snow & Co.
ATTORNEYS.

Patented Jan. 30, 1951 2,539,565

UNITED STATES PATENT OFFICE 2,539,565

APPARATUS FOR DELIVERING AND RECEIVING TELEPHONE MESSAGES

Donald C. Beatty, Birmingham, Ala.

Application March 4, 1949, Serial No. 79,707

7 Claims. (Cl. 179—6)

This invention relates to improved electrical apparatus for delivering a message to a party calling an unattended telephone and for receiving, after such message has been delivered, any message which the calling party may desire to leave.

In my co-pending patent application Serial Number 40,248, filed July 23, 1948, now Patent No. 2,525,763, granted October 17, 1950, an apparatus for the same purpose is described. The main purpose of the present invention is to provide an improved circuit for such an apparatus, and to include therein means for automatically opening said circuit to turn off the apparatus when it has discharged its function on a specific occasion of use.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawing

Figures 1, 2, 3:
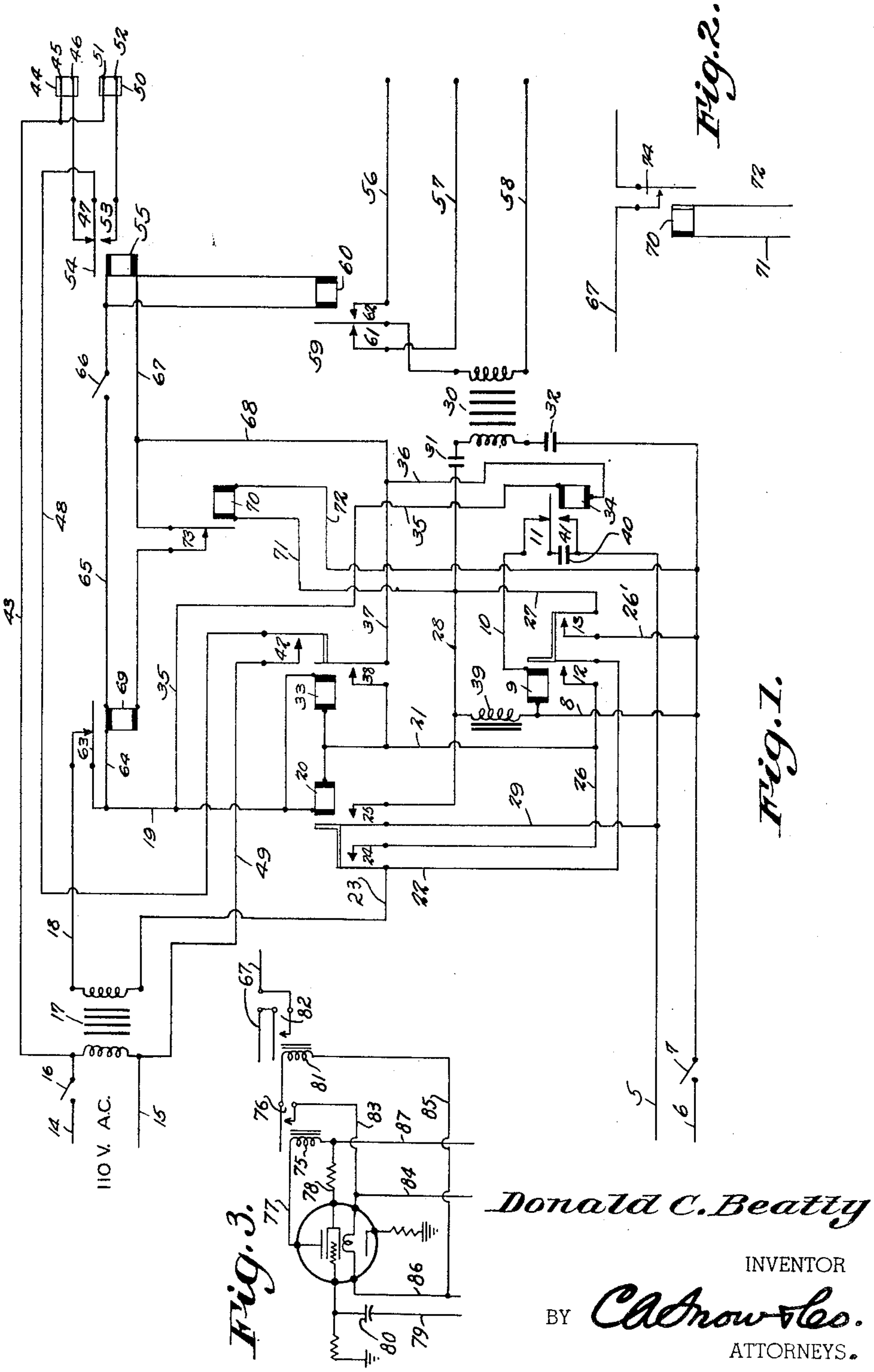
Figure 1 is a schematic view of apparatus constructed in accordance with the invention.
Figure 2 is a schematic view of a modification.
Figure 3 is a schematic view of a sound controlled relay and its connections with the control circuit.

Referring to the drawing in detail, 5 and 6 are leads connected directly to the ordinary telephone circuit including a telephone instrument, not shown, and its signal device, also not shown.

When the telephone is attended, manually operated switch 7 is left open. During these periods the apparatus of the invention is out of use, and ordinary use of the telephone is made. When, however, the telephone instrument is to be left unattended, switch 7 is manually closed so that when calls are made to the unattended instrument, the apparatus will operate in a manner to be described.

Extending from telephone lead 6 is a lead 8 to a relay 9 from which extends lead 10 in which is located the normally closed switch contacts 11 with the current then passing back through condenser 40 to telephone lead 5.

When relay 9 is energized, it will close contacts 12 and contacts 13.

From the description so far provided, it will be seen that with the telephone instrument unattended and switch 7 closed, a call placed to the telephone will, on the first surge of the intermittent ringing current, energize the relay 9 so as to momentarily close contacts 12 and 13.

Plugged into the ordinary house or other local electric supply are the leads 14 and 15. A manually operated switch 16 is located in the lead 14. Leads 14 and 15 are connected to the terminals of the primary winding of a power transformer 17.

Connected to one of the terminals of the secondary winding of the power transformer is lead 18. It may be noted, therefore, that when relay 9 is momentarily energized, a circuit will be closed as follows: lead 18, lead 19, holding relay 20, lead 21, closed contacts 12, leads 22 and 23, and back to power transformer 17.

When holding relay 20 is so energized, it will stay energized, even though contacts 12 immediately open under the intermittent energizing and de-energizing of relay 9 caused by the intermittent characteristic of the ringing current. Holding relay 20 will stay energized because it will have closed contacts 24, 25. The closing of contacts 24 places a short across the contacts 12 so that the current for energizing holding relay 20 passes from lead 21 not through the contacts 12, but through lead 26, closed contacts 24, lead 23, and back to power transformer.

The momentary closing of contacts 13, meanwhile, imposes an intermittent short circuit across telephone leads 5 and 6 as follows: from lead 6, through lead 26′, closed contacts 13, lead 27, lead 28, closed contacts 25, lead 29, and telephone lead 5. This causes a cessation of the intermittent ringing current.

As a result, a "sustaining" current is stabilized in the telephone circuit, much as is used for ordinary telephone conversation. This stabilized "sustaining" current condition will persist in the telephone circuit until it is interrupted following full use of the apparatus. This "sustaining" current is now closed through to one winding of a coupling transformer 30. Lead 28 is connected to one post of said winding, with a blocking condenser 31 being located adjacent to and being connected in series between said lead and winding. Telephone lead 6 is connected to the other post, with a blocking condenser 32 being located adjacent to and being connected in series between said lead and said winding.

The closing through of the electrical circuit to one side of the coupling transformer 30 may be traced as follows: telephone lead 6, blocking condenser 32, coupling transformer 30, blocking condenser 31, lead 28, contacts 25, lead 29, telephone lead 5.

In circuit with the holding relay 20 is a relay 33. This is a "slow acting" relay, of the type that is activated following a predetermined period of time after an electrical circuit is completed to and through its field winding. Accordingly, after said period of time has elapsed, the slow acting relay 33 goes into operation. This closes a circuit to a relay 34 as follows: from secondary winding of power transformer 17, through lead 18, lead 19, lead 35, relay 34, lead 36, lead 37, closed contacts 38, leads 21 and 26, closed contacts 24, lead 23, and back to power transformer.

At this point, it may be noted that I provide a reactance coil 39. This impedance is shunted across leads 5 and 6 upon the closing of contacts 25.

The purpose of this is to permit the operation of message counting devices, not shown, and the operation of devices in coin-operated telephone instruments, also not shown, which through their operation deposit an inserted coin in its proper receptacle, rather than return it to the depositor as would be the case if such an electrical "loading" of the automatic switching circuit was not present. It is found desirable to use such an impedance in the circuit to permit the operation of such message registers and coin-operated devices, where blocking condensers such as 31, 32, are used in series with leads to the coupling transformer 30 as shown. Blocking condensers 31, 32, in turn, being in series with the leads 28 and 6, serve the function of preventing the passage of the "sustaining" direct current from the telephone leads to and through one winding of the coupling transformer. Likewise, these condensers permit transfer of sound impulses with greater fidelity.

In the intermittent "ringing" circuit hereinbefore described is the condenser 40, and energizing of the relay 34 will open the contacts 11 and close contacts 41. This places a short circuit across the condenser 40, dissipates the stored-up electrical charge in the condenser created by the intermittent ringing current, and opens the closed electrical ringing circuit created by lead 6, lead 8, relay 9, lead 10, contacts 11, condenser 40, and lead 5.

When the slow acting relay 33 was energized, it also closed normally opened contacts 42. These contacts control electrical circuits for powering the recording or input section of a suitable recording device, not shown; or the play-back or output section of said recording device. It is desirable of course that a circuit be closed through the output section of the recording device for the purpose of sending sound impulses from the recording device out through the telephone leads 5 and 6—in other words, for the purpose of delivering a previously recorded message to a calling party.

Similarly, it is desirable that a circuit be closed through the recording or input section of the recording device for the purpose of permitting sound impulses to be sent from the telephone leads 5, 6 to the recording device for the purpose of recording a message being delivered by the calling party.

The circuit for powering the recording or input section of the recording device is as follows: house supply lead 14, lead 43, plug receptacle 44 having posts 45 and 46 adapted for electrical connection to the recording or input circuit of the recording device, not shown, contacts 47, lead 48, contacts 42, lead 49, and out through house supply lead 15.

The circuit for powering the output or play-back section of the recording device is the same as that traced immediately above except that plug receptacle 50 having posts 51 and 52 electrically connected to the output section of the recording device is substituted for plug receptacle 44, and contacts 53 are substituted for contacts 47.

The switching between circuits is accomplished by single pole, double throw switch 54 controlled by a relay 55. When relay 55 is not energized, contacts 47 are closed to operate the input section of the recorder. When relay 55 is energized, contacts 53 are closed to operate the output or play-back section of the recorder.

Leads 56, 57, 58 are connected to the recording device and through these sound impulses are transmitted between the recording device and the telephone leads 5, 6. Lead 58 is a common lead which is in circuit between the telephone circuit and the recording device whether sound impulses are being delivered by the recording device, or are being received by the recording device. Lead 56 is used for transmitting sound impulses from the recording device to the telephone leads; lead 57 is used for transmitting sound impulses in the other direction, from the telephone leads to the recording device.

Lead 58 being a common lead, it is constantly in circuit with one side of the secondary winding of the coupling transformer 30. A single pole, double throw switch 59, however, is controlled by a relay 60 for the purpose of closing either contacts 61 or 62 so as to bring into the circuit either lead 56 or lead 57.

In this connection, relays 55 and 60 will both have been energized at the time the slow acting relay 33 was energized. This is by reason of the fact that the slow acting relay 33 will have closed contacts 38. Therefore, a circuit will have been closed as follows: lead 18, normally closed contacts 63, lead 64, lead 65, normally closed switch 66, relays 55 and 60, lead 67, lead 68, lead 37, contacts 38, lead 21, lead 26, contacts 24, and lead 23 back to the power transformer.

Therefore, it will be seen that relays 55 and 60 having been energized at the time stated, the contacts 53 to the output section of the recorder will be closed, and contacts 62 will also be closed, bringing into the recorder output circuit the leads 56, 58 for the purpose of delivering the output to the telephone leads 5, 6. In other words, when the calling party places his call, a short time interval will transpire from the time the first ring is made on the instrument, this time interval being that required for activation of the slow acting relay 33. After this time interval, the previously recorded message left on the recording device will be delivered inductively through the coupling transformer 30 to the calling party.

When the recorded message has been delivered through the output or play-back section of the recorder, the switch 66 will be mechanically tripped by any suitable means by the recorder, and will be opened. This will result in de-energization of relays 55 and 60. Therefore, contacts 47 will close and contacts 61 will close. This powers the input or receiving section of the recorder, and the calling party delivers his message over the leads 57, 58 which will now be electrically connected through the coupling transformer to the telephone leads 5 and 6.

Means is provided for the purpose of causing all circuits to open after full operation of the device, that is, after a previously recorded message has been delivered to the calling party, and after the calling party has delivered a message into the recording device. To this end, I provide a cut off relay 69 which is normally de-energized. When energized, cut off relay 69, opens contacts 63 and this will cause reversion of all circuits to their normal or inoperative conditions, awaiting the next call to the instrument.

I provide a means for energizing the relay 69 at the desired time. To this end, a relay 70 has leads 71 and 72 respectively connected to lead 28 that extends to the telephone lead 5, and to telephone lead 6. Therefore, relay 70 will have been energized on stabilization of a "sustaining" current in the telephone circuit, and therefore will open and hold open throughout the use of the apparatus the contacts 73. With these contacts 73 open, the cut off relay 69 cannot be energized.

I propose, in this connection, to control the relay 70 in any of various ways.

For example, relay 70 can be controlled by a slow acting type of relay; an electrical time control device; or a voice or sound controlled relay which will stay in an operative position for a predetermined period of time following the cessation of a current carrying voice or sound impulses in an electrical circuit, and which will move to an inoperative position at the end of said predetermined period of time.

With respect to this last, said voice controlled relay, not shown, would be placed at any suitable location in the telephone "sustaining" circuit in which the relay 70 is located. As a result, after all sound impulses in either direction have been terminated, said sound controlled relay would operate to open the circuit including relay 70, thus to de-energize the relay 70, causing contacts 73 to revert to closed position, thus to close a circuit to the cut off relay 69 which in turn would open the contacts 63 and open all other circuits.

An alternative connection can be that shown in Figure 2, wherein the relay 70 is adapted to be controlled by an electrical timing device, not shown. In this arrangement, leads 71 and 72 would not lead to the leads 28 and 6. Rather, they would be connected electrically to an electrical timing device set into motion by beginning of the stabilized "sustaining" current in the telephone circuit. When said timing device has operated for a predetermined and preset time interval, it could close a circuit through relay 70, which would then close the normally open contacts 74, thus to energize the cut off relay 69.

It is to be understood that the apparatus is of course not limited to use with alternating current. Direct current operation can be provided for by eliminating power transformer 17; connecting leads 43 and 18 to one side of a local direct current supply; connecting leads 49 and 15 to the other side; and providing a switch in one side of said supply to perform the same function as switch 16 does when the apparatus is operated by alternating current as shown in the present drawing.

Figure 3 illustrates the sound controlled relay hereinbefore discussed, which relay is controlled by sound impulses formed in the circuit as long as a message is being either delivered to or given by the recording device.

To this end, I provide a voice-controlled relay and connections thereof to the control circuit of the device wherein a relay 81 is analogous to the relay 70 of Figs. 1 and 2, and wherein the contacts 82 are analogous to the contacts 73 of Fig. 1 or the contacts 74 of Fig. 2. Utilizing the connections illustrated in Fig. 3, the leads 71 and 72 of Figs. 1 or 2 would be eliminated.

In Fig. 3, a relay 75 is a high resistance, fast release type having a pair of normally open contact points 76. The field coil of this relay is in series as at 77 with the high voltage positive plate supply to the plate of a suitable type of actuating tube. The grid of this tube is connected at 79 to the plate of the last amplifier tube of the recorder amplifier (not shown) with a blocking condenser 80 being placed in series in the lead 79 to isolate the grid from a direct connection with the positive current going to the plate of said amplifier tube. Relay 75 is further in series at 78 with the grid of the illustrated 6SJ7 tube.

Relay 81 as beforementioned has correspondence with the relay 70 of Fig. 1 and is a "slow acting" relay that is activated following a predetermined period of time after an electrical circuit is completed to and through its field winding. Such an electrical circuit is completed by the closing of the normally open contacts 76 operated by relay 75, relay 81 being connected in series with said contacts. When relay 81 is finally activated after said pre-determined period of time, it operates to close its contacts 82, that have correspondence with the contacts 73 of Fig. 1 and are connected in series in the lead 67. Thus, at such time as the contacts 82 close, a circuit is completed to relay 69 of Fig. 1, opening the contacts 63 and causing reversion of all circuits to their normal or inoperative conditions, awaiting the next call to the instrument.

By means of a lead 83, the slow acting relay 81 and normally open contacts 76 are connected in series to a lead 84 extending to the lead 19 to the secondary winding of power transformer 17. They are also connected, by means of lead 85, to a lead 86 extending to the lead 68 of Fig. 1.

In operation, the voice-controlled relay cut-off functions as follows: When the telephone ringing current activates the main circuit, the relay contact points 38 close after a short delay. This completes the circuit to the filament of the illustrated tube controlling the voice relay, since lead 86 extends from lead 68 that is connected to said contact points 38. As soon as the tube warms up properly, current begins flowing through the field coil of the relay 75 which is connected in series between the plate of the tube and the high voltage plate supply, there being a lead 87 extending from said relay 75 to the plus or minus 250 volt plate supply of the recorder amplifier.

Since the grid of the tube is connected through a blocking condenser with the plate of the recorder amplifier tube, any sound impulses being handled by that amplifier will in turn be impressed into the tube controlling the voice relay. These impulses result in an exceedingly rapid variation in the voltage of the current flowing between the plate of that tube, the field winding of relay 75, and the high voltage plate supply. This voltage reduction in the field winding of relay 75 causes its normally open contacts 76 to make and break contact intermittently, that is, each sound impulse impressed into the tube causes the contacts to return to their normally open position.

With relay 75 opening and closing its contacts intermittently as sound impulses are impressed into the actuating tube, the electrical circuit through the field winding of slow acting relay 81 is similarly interrupted. This interruption will continue as long as sound impulses exist in the circuit. Upon the cessation of such impulses, contacts of relay 75 will be held in the closed position, the electrical circuit through the field winding of relay 81 will be held in a completed condition, and the contacts 82 of relay 81 will close after a pre-set period of time.

With the closing of contacts 82, the electrical circuit to and through the field winding of cut-off relay 69 is completed. Contacts 63 are thus opened causing a reversion of all circuits to their normal or inoperative conditions awaiting the next use of the device.

What is claimed is:

1. Electrical apparatus for receiving and delivering telephone messages comprising a starting switch; means connected conductively to a telephone circuit for closing said switch momentarily responsive to ringing current impressed on said circuit; a power circuit including and momentarily closed by said switch; a holding relay in the power circuit and holding the power circuit closed, after opening of said switch; a secondary circuit, closed by said relay; recorder input and output circuits connected to the telephone circuit by said relay; means in the secondary circuit for closing the recorder output and input circuits in turn for successive delivery and recording of messages; a normally closed turn-off switch in the power circuit; a relay connected to the secondary circuit and opening said turn-off switch when activated; and means controlled by sound impulses travelling to and from said recorder input and output circuits and activating said relay on cessation of said impulses.

2. Electrical apparatus for receiving and delivering telephone messages comprising a starting switch; means connected conductively to a telephone circuit for closing said switch momentarily responsive to ringing current impressed on said circuit, a power circuit including and momentarily closed by said switch; a holding relay in the power circuit; a coupling transformer; a set of switches closed by the holding relay one of which by-passes the starting switch to hold the power circuit closed, the remaining switches of said set connecting one field winding of the transformer to the telephone circuit; a secondary circuit closed by said relay; recorder input and output circuits connected to the other field winding of the transformer; means in the secondary circuit for closing the recorder output and input circuits in turn for successive delivery and recording of messages; a normally closed turn-off switch in the power circuit; a relay connected to the secondary circuit and opening said turn-off switch when activated; and means controlled by sound impulses travelling to and from said recorder input and output circuits and activating said relay on cessation of said impulses.

3. Electrical apparatus for receiving and delivering telephone messages comprising a starting switch; a starting relay connected conductively to a telephone circuit for energization by intermittent ringing current impressed on said circuit to close said switch momentarily; a power circuit including and momentarily closed by said switch; a holding relay in the power circuit; a coupling transformer; a set of switches closed by the holding relay one of which by-passes the starter switch to hold the power circuit closed and the rest of which connect one field winding of the transformer conductively to the telephone circuit; a secondary circuit closed by the holding relay; a delayed action relay in the secondary circuit; contacts closed by the delayed action relay; recorder input and output circuits connected to the other field winding of the transformer; means operable by closing of said contacts for closing the output and input circuits in turn, for successive delivering and receipt of messages; a normally closed turn-off switch in the power circuit; a relay connected to the secondary circuit and opening said turn-off switch when activated; and means controlled by sound impulses travelling to and from said recorder input and output circuits and activating said relay on cessation of said impulses.

4. Electrical apparatus for receiving and delivering telephone messages comprising a power circuit including a source of electricity; means connected conductively to a telephone circuit and adapted to cause the power circuit to be closed momentarily responsive to intermittent ringing current impressed on the telephone circuit; means for holding the power circuit closed; a secondary circuit; means in the power circuit for closing the secondary circuit; a delayed action relay in the secondary circuit; contacts closed by the delayed action relay; recorder input and output circuits, connected to the telephone circuit; means operable by closing of said contacts for closing the output and input circuits in turn for delivery and receipt of messages; a turn-off control relay in the secondary circuit; a normally closed turn-off switch in the power circuit; a relay connected to the secondary circuit and opening said turn-off switch when activated; and means controlled by sound impulses travelling to and from said recorder input and output circuits and activating said relay on cessation of said impulses.

5. Electrical apparatus for delivering and receiving telephone messages comprising a power circuit; means operable responsive to signal surges sent through a telephone circuit to close and hold closed said power circuit; a secondary circuit; means in the power circuit for closing the secondary circuit; a delayed action relay in the secondary circuit; contacts closed by the delayed action relay; recorder input and output circuits, connected to the telephone circuit; means operable by closing of said contacts for closing the output and input circuits in turn for delivery and receipt of messages; a normally closed turn-off switch in the power circuit; a relay connected to the secondary circuit and opening said turn-off switch when activated; and means controlled by sound impulses travelling to and from said recorder input and output circuits and activating said relay on cessation of said impulses.

6. Electrical apparatus for delivering and receiving telephone messages comprising a power circuit; means operable responsive to signal surges sent through a telephone circuit to close said power circuit; a holding relay in the power circuit; a coupling transformer; a set of switches closed by the relay one of which by-passes said means to hold the power circuit closed and the rest of which connect one field winding conductively to the telephone circuit; a secondary circuit closed by the holding relay; a delayed action relay in the secondary circuit; contacts closed by the delayed action relay; recorder input and output circuits connected to the other field winding of the transformer; means operable by closing of said contacts for closing the output and input circuits, in turn, for successive delivering and receipt of messages; a normally closed turn-off switch in the power circuit; a relay connected to the secondary circuit and opening said turn-off switch when activated; and means controlled by sound impulses travelling to and from said recorder input and output circuits and activating said relay on cessation of said impulses.

7. Electrical apparatus for receiving and delivering telephone messages comprising a starting switch; a starting relay connected conductively to a telephone circuit for energization by intermittent ringing current impressed on said circuit to close said switch momentarily; a power circuit including and momentarily closed by said switch; a holding relay in the power circuit; a coupling transformer; a set of switches closed by the holding relay one of which by-passes the starter switch to hold the power circuit closed and the rest of which connect one field winding of the transformer conductively to the telephone circuit; a secondary circuit closed by the holding relay; a delayed action relay in the secondary circuit; contacts closed by the delayed action relay; recorder input and output circuits connected to the other field winding of the transformer; means operable by closing of said contacts for closing the output and input circuits in turn, for successive delivering and receipt of messages; a normally closed switch in the power circuit; a relay connected to the secondary circuit and opening said turn-off switch when activated; and means controlled by sound impulses travelling to and from said recorder input and output circuits and activating said relay on cessation of said impulses.

DONALD C. BEATTY.

REFERENCES CITED

The following references are of record in the file of this patent:

UNITED STATES PATENTS

| Number | Name | Date |
|---|---|---|
| 2,005,788 | Keiser | June 25, 1935 |